Patented Aug. 20, 1935

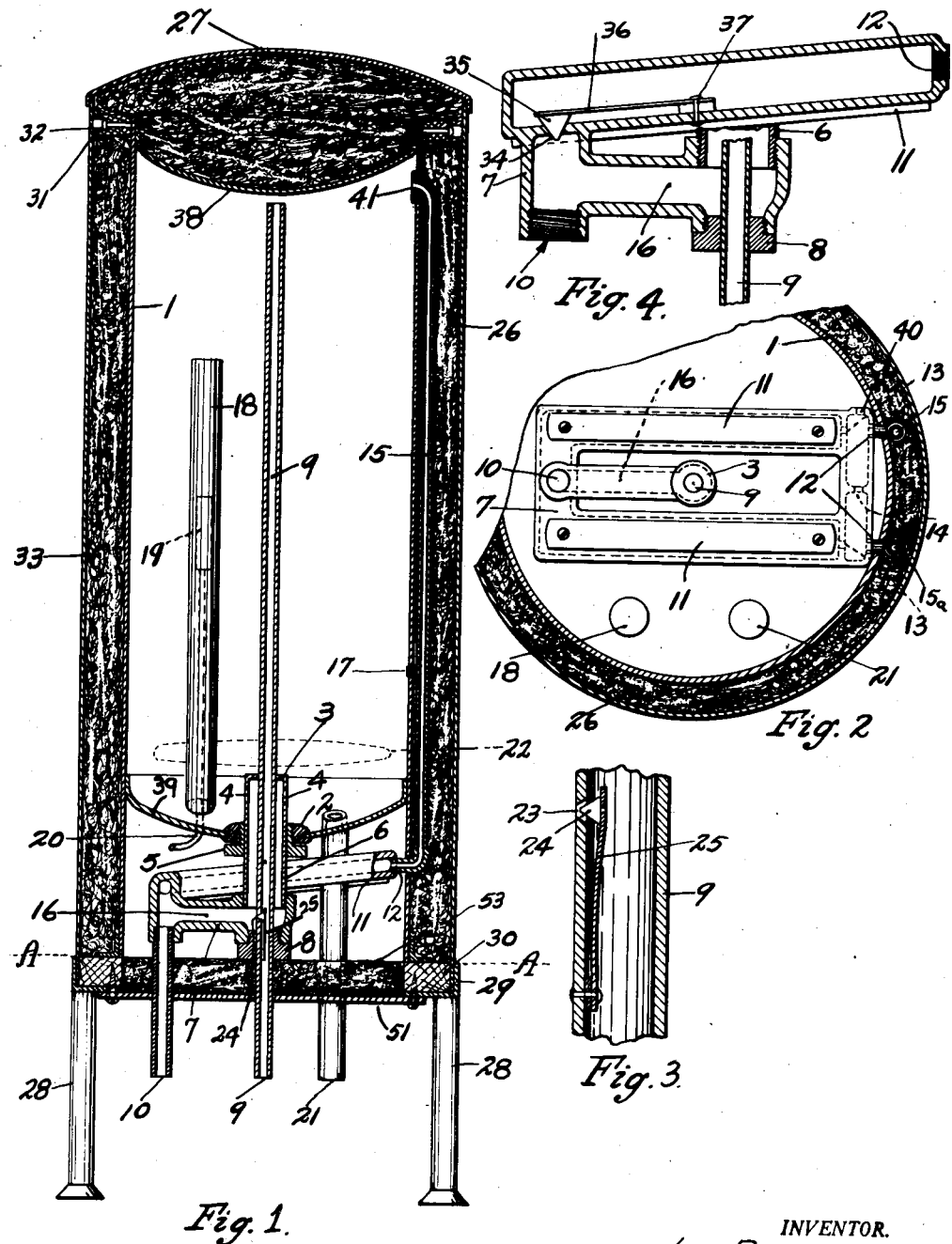

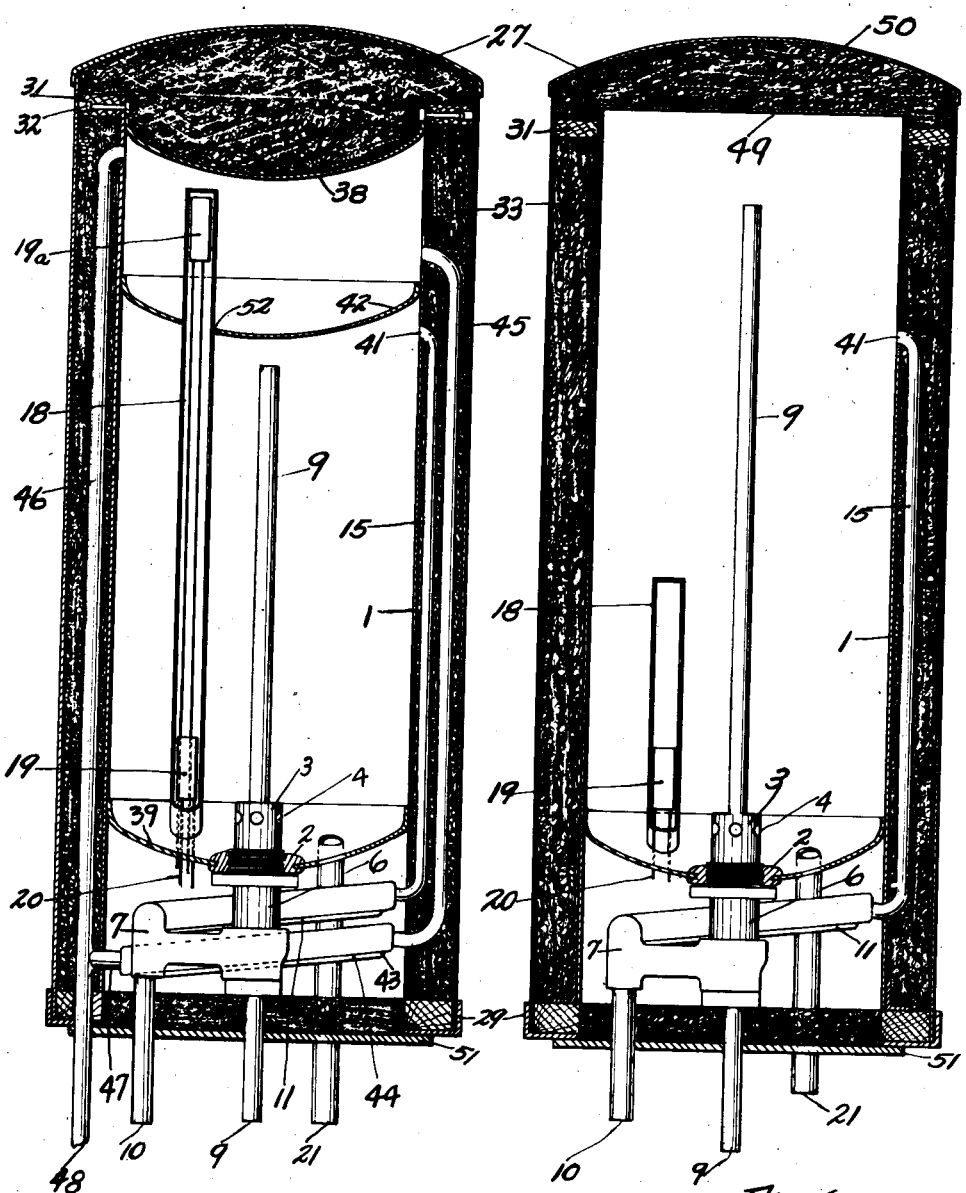

2,012,101

UNITED STATES PATENT OFFICE 2,012,101

LIQUID HEATING SYSTEM

Lee Powers Hynes, Albany, N. Y.

Application July 19, 1929, Serial No. 379,381

74 Claims. (Cl. 219—39)

This invention relates to improvements in liquid heating systems. Due to the smaller number of British thermal units per dollar obtained from electrical heat than from other kinds of heat, one object of my invention is the most efficient application and use of the heat with the minimum of loss.

Another object of this invention is to make an electrically heated hot water system which is flexible enough to meet conditions; ranging from, use by one individual infrequently, to use by a large number of persons; which would require (in the present systems) an outfit of much greater capacity; giving water of the desired temperature under all conditions.

I have a plurality of heating elements which may be controlled thermostatically, manually, or one set may be controlled thermostatically and the other manually, the manual one used for extra heating when desired. They may be connected, the main heating element on a low rate meter and the auxiliary, quick heating, coil on a high rate meter; the water in the tank down to the level of the thermostat bulb being heated to an ordinary heat and controlled by the thermostat and when extra hot water is desired the auxiliary is used to bring the water to this extra temperature.

When two meters are used, the rate is often very low for a small wattage load. An off peak clock may be used to control one heater for low rate night use and the auxiliary heater used for constant service.

The thermostatic element may be raised or lowered to any desired level, thus predetermining the amount of hot water desired; or two thermostats may be used at different levels, giving a high rate of heating when both heaters are in operation and when the hot water descends to the level of the upper thermostat, one heat unit is cut off, the other one continues heating the water (at a slower rate) until it descends to the level of the lower thermostat which cuts off this heat unit.

Referring to the drawings: Fig. 1 shows a vertical section through my device, Fig. 2 is a view from the bottom with the lower closure removed, Fig. 3 is an enlarged section showing thermostatic valve mounted in the hot water discharge pipe, and Fig. 4 is a sectional view of an arrangement for a thermostatic valve to control the amount of cold water entering the heating chambers.

Fig. 5 shows a tank arranged with an upper section for much hotter (or boiling) water, the upper section being heated by a separate high rate heater and controlled by a separate thermostat.

Fig. 6 shows a non-pressure tank with my heating arrangement.

The tank 1 has the heads 38 and 39 preferably concave at the top and convex at the bottom with the cylindrical wall extending below the bottom head to act as a housing for the heating and control apparatus. An outer shell 26 which may be metallic, or non-metallic and cover 27 surround the tank 1 and allow a space for the insulation 33, the wooden rings 30 and 31 serving as supports, and also as breakers to the flow of heat from the tank to the outer shell. A suitable base 29 with any desired arrangement of feet 28 is provided to support the unit. The bottom of the tank has a threaded portion 2, into which I screw a bushing 5. The bushing 5 has mounted a closed nipple 3 with one or more side openings 4. Below this nipple 3 and supported by the same bushing 5 is straight nipple 6 which carries on its lower end metallic chamber 7. This metallic chamber carries in its lower part, preferably in line with the nipples 3 and 6, a bushing 8 which has fixed to it a pipe or conduit 9 extending upwardly, through an opening in the nipple 3 to a point near the top of the tank; and downwardly for connection to the delivery pipes. The pipe 10 leads cold water into the metallic chamber 7.

The upper part of this metallic chamber divides into a plurality of branches which are inclined slightly upward and underneath which are mounted the flat iron clad heaters 11. Reflectors 53 are used to reflect stray heat rays upward in many cases. At the upper end of each branch I have the outlet tappings 12. Reduced orifices 13 are provided, the size of which depend on the rate of the heater and the desired temperature to which the water is to be heated. These orifices 13 lead into a cross passage, which has a dividing wall provided with a reduced opening or orifice 14. This orifice 14 may be plugged through plug hole 40, if required, for certain operating conditions, or adjusted to proper size for other conditions as will be explained later.

Connected to the outlet tappings 12 are pipes 15 and 15a which lead the hot water upward and into the tank at 41 and in some cases I may let one pipe lead in at 41, near the top of the tank, and the other at some other level, for instance at 17.

Mounted in the bottom 39 of the tank I have a pipe 18, closed at its upper end into which is inserted from below a thermostatic bulb 19 with its connecting tube or wires 20 leading down to the thermostat (not shown) which may be of any well known make. The level of hot water may be set at any point desired by raising or lowering the bulb 19 in the pipe 18. For a plurality of controls other pipes like 18 may be used in the same manner, or a single pipe 18 may contain a plurality of bulbs at different levels. A drain pipe 21 is provided for draining the tank.

A thermostatic mixing valve may be placed in the pipe 9, the bimetallic element 25 when heated lifts the valve 24 off of its seat 23 and communicating with the cold water passage 16, the purpose of which is disclosed later on. Likewise another thermostatic valve (Fig. 4) may be used, if desired, to control the admission of cold water to the heater. The bimetallic element 36, when the temperature reaches a predetermined point, lifts the valve 35 from its seat 34, allowing cold water to pass from the passage 16 into the heating chamber.

When the heat is turned on the cold water in the casing 7 is heated by the heaters 11. Assuming that only one outlet 12 is used and the other one plugged, and the orifice 14 is left open so that both heaters deliver water to pipe 15 leading to top of the tank through 41. Cold water from the tank flows down through openings 4 in nipple 3, through nipple 6 to passage 16 in casing 7, on into the heating chambers. One or both heaters may be used as desired, and the sizes of the orifices 13 and the area of the pipe 15 are proportioned to deliver water of a uniform temperature to the top of the tank regardless of whether one or both heaters are used.

Another method is to use both outlets 12, connecting one by pipe 15 to the opening 41 at top of the tank, and the other by pipe 15a to an opening 17, one pipe discharging at the top of the tank and the other at a different level. In this case the orifice 14 may be closed by a solid plug or reduced in size.

When water is drawn through pipe 9, it comes from the top of the tank. To replace this, more cold water enters through pipe 10, passage 16, nipples 6 and 3, and on through the openings 4 into the bottom of the tank. By placing these openings 4 on side of nipple 3 I get a horizontal flow at a low velocity and a minimum of mixing action with the warmer water above.

Under full flow of hot water in pipe 9 a small amount of heat is given up to the cold water in the lower part of the tank, but by varying the faucet opening the temperature of the water may be controlled to some extent. In case of leaky faucets the rate of flow is so slow that the cold water coming in to replace the leaking water will absorb the heat and keep it in the tank.

When the tank is drawn upon heavily the cold strata is greater, tending to reduce the temperature of the hot water used. This conserves the heat and I find that there is quite a range within which water is warm enough for use. In some cases I have found it desirable to put in the delivery pipe, within the tank, one or more coils or radiators, so that as the body of cold water rises (upon withdrawal of hot water) it contacts with a lower radiator with a resultant heat exchange, and as still more is drawn it contacts with the next one above, the effect being that the greater amount of hot water withdrawn the greater the rate of heat exchange to the cold water which entered the tank.

Where it is desired to supply water at a greater rate than the capacity of the tank, the thermostat may be set for a higher temperature (say 190°–195° F.), and by having a properly proportioned coil of pipe or radiator 22 (shown dotted) in series with the pipe 9, in lower part of the tank, the water may be made to give up 40 to 50 degrees of its heat to the cold water coming in, thus enabling one to get a greater supply of hot water than the ordinary capacity.

A thermostatic mixing valve which I described above may be used in a similar manner, heating the water to 190°–195° F., and when water is drawn, this hot water heats up the bimetallic element 25, lifts the valve 24 off its seat 23, allowing cold water to pass into the pipe 9 and mix with the extra hot water, the small differential pressure, causing the valve opening of such size to give a mixture of a predetermined temperature.

By running all pipe connections down through the bottom, loss of heat due to conduction along the pipes is eliminated. The tank will not heat below the openings 4 regardless of where thermostat is located, therefore the lowest strata of water in the tank is cold. Even the pipe 9 gives up to the tank the heat of its outlet portion, and during long periods of standing, there is no loss of heat as would be the case with an external heat trap and/or top outlets. As hot water will not flow downward except under pressure, the pipe 9 acts as its own trap.

While the heater casing 7 could be located at the side of the tank, or any other outside point, I prefer to mount it underneath as shown so that all heat units that fail to be taken up by the water in casing 7 will rise up to the bottom of the tank, to be taken up by the water there, tending to give excellent heat economy.

The tank is very easy to construct, the castings are simple in shape and easy to machine, and the whole assembly is simple.

In case the tank is empty and heat is accidently turned on, the hot air arises in the tube 18, heating the thermostat bulb 19, causing the thermostat to cut the current off the heaters, thus preventing them from being damaged. However, to save even this loss of heat I reserve the right to employ a means for making it impossible to get any current through the heaters when there is no water in the tank. There are several ways of accomplishing this, one of which is putting a pressure switch in the cold water supply line 10.

In cases where it is desired to have available, in addition to hot water, a supply of boiling water, the arrangement shown in Fig. 5 is used. In this I have, in addition to the elements in Fig. 4, a second head 42 through which the thermostat tube 18, extends. The opening 52 through which this tube extends is larger than the diameter of the tube so that water may pass from the lower to the upper compartment. The water in the lower compartment is heated in the same manner as above outlined. The water in the upper compartment is heated in the heating chamber 43 by the metal clad heater 44. It then passes up the pipe 45 into the upper compartment. The heated water is replaced by water from this upper compartment passing down the pipe 4, through the nipple 47 to the heater 43—thus I get circulation. To get boiling water I draw it at the extension of pipe 46—48. To get hot water I draw it from the extension of the pipe 9. The cold water supply connects to 10, and 21 is the drain.

In localities where the tank must be frequently opened and cleaned out, I use the non-pressure type shown in Fig. 6. In this tank the elements are arranged in the same manner as described in Fig. 1 except that I have the cap 27, the top insulation 50, and the top cover 40 of the tank 1, removable for cleaning out. A valve (not shown) in the line 10, when opened, allows the tank to fill with water. When water runs out of the extension of pipe 8, the valve should be closed. The heater 11 on the chamber 7 heats this up until the heat level reaches the level of thermostat 19 which cuts off the current from the heater. To get hot water I open the valve in the cold water line 18. This allows cold water to go into the tank, displacing the hot water which runs out of the pipe 8.

This non-pressure construction is valuable for odd shaped tanks to fit into available spaces, for instance a tank of triangular section for use in the corner of a room, or a flat rectangular tank for ceiling mounting, or for attachment under or back of an electric range. It is also ideal for small and inexpensive vessels such as a tea kettle, local urns for shaving water, and for hospital and laboratory uses.

I claim:

1. A storage tank, a housing beneath and external to the tank, a heating chamber within the housing, a hot water conduit and a cold water conduit between the tank and the chamber, an electrical heater for said chamber, having thermal control means communicating with said tank, supply and delivery pipe connections and electrical connections located within the housing and an upright heat insulated casing enclosing all said parts, said hot and cold water conduits being provided for internal recirculation between the tank and the chamber and to permit the inflow of cold water to the tank to replace that drawn from the tank via said delivery pipe.

2. An upright storage tank, sides of which extend downwardly to form a compartment containing a heating chamber, hot and cold water conduits between the chamber and the tank for recirculating water therebetween and forming a passage for cold water between the bottom of the tank and said heating chamber, a heat unit in heat exchange relation to the chamber, an electrical control element for said heat unit, control wires and supply and delivery pipe connections to said tank and said heating chamber, the bottom, top and sides of said tank and chamber being covered by a heat-insulated casing.

3. In a hot water supply system, an upright storage tank, the sides of which extend downwardly to form a housing for a heating chamber, a heat unit, supply, delivery, and drain pipe connections; said housing communicating with a closed column extending upwardly into a body of water in the said tank, a control means in said column for the heat unit, all of the foregoing being enclosed in a heat insulated casing.

4. In a hot water supply system, an upright storage tank, the sides of which extend below its bottom head, a delivery pipe extending from near the top of the tank, downwardly through said bottom head, a heating chamber with center axis inclined, the upper end leading to a point near the top of the tank, and the lower end connected to the cold water supply and to the bottom of the tank through a conduit substantially parallel to and concentric with the said delivery pipe, an electric heater on the lower side of said heating chamber, a thermostat for controlling temperature of the hot water, and a heat-insulated casing enclosing tank and said elements.

5. In a hot water supply system, an upright storage tank having sides extending downwardly below the bottom head to form a lower compartment, said lower compartment containing an inclined heating chamber having a hot water conduit and a cold water conduit concentrically disposed between the chamber and said tank, supply, delivery and heating means and communicating with a control means for said heating means, all of said elements being enclosed in a heat-insulated casing with a removable portion.

6. In a hot water supply system, an upright storage tank having sides extending downwardly below the bottom head to form a lower compartment, said lower compartment containing an inclined heating chamber having a hot water conduit communicating with said tank and a cold water conduit also communicating with the tank and embracing a portion of said first conduit, supply, delivery and heating means and communicating with an electrical control means, the whole being enclosed in a heat-insulating casing with a removable portion, and external connections to said tank passing through said heat-insulating casing near the lower part of said tank.

7. In a hot water supply system, an upright storage tank having sides extending downwardly below its bottom head to form a lower compartment, said lower compartment containing supply, delivery, heating, and circulating means, and communicating with a vertical closed column, containing a control means for the heating means, the said tank with its upper and lower compartments being enclosed in a heat-insulating casing having a removable portion, the supply, delivery and drain pipes passing through said bottom.

8. In a hot water supply system, an upright storage tank having sides extending downwardly below its bottom head to form a lower compartment; said lower compartment containing the supply, delivery and heating means; a conduit passing through the wall of the said lower compartment and leading upwardly to a point between the top and bottom of said tank for delivering hot water from said heating means to said tank, a vertical closed column, containing control means for said heating means, within said tank and communicating with said lower compartment; all of the above parts being enclosed in a heat insulating casing, an annular base with a plurality of feet for supporting said tank and its elements, a supply pipe, a delivery pipe and a drain pipe passing through the bottom of the heat insulated casing and through the opening in the said annular base.

9. In a hot water supply system; an upright storage tank, having top head concave and bottom head convex, the sides of which extend below said bottom head to form a lower compartment; said lower compartment containing an inclined heating chamber with an electric heating element on its under side, lower end of said chamber communicating with a cold water supply and a conduit in the bottom of the tank, and a conduit from the upper end of said chamber leading through the wall of said lower compartment, along the outside of tank proper to a point between the top and bottom of said tank; a delivery pipe extending from a point near the top of said tank downwardly in substantially the center axis of said tank to be connected, at a point below said convex bottom head, to said supply system; a thermostat for controlling said heating element; a heat-insulating casing covering the tank and said external conduit; a supply pipe, a delivery pipe, and a drain pipe, leading downwardly from the said lower compartment and a split, heat-insulating closure for lower compartment, removable from said compartment and from around said pipes.

10. In a hot water supply system; an upright tank, having top head concave and bottom head convex, the sides of which extend below the bottom head to form a lower compartment; the tank or upper compartment being water-tight and the lower compartment open on its bottom end and provided with a removable heat-insulated cover, membering up with another heat-insulated envelope, enclosing the upper compartment, containing water and a control means; and the lower compartment containing a heating means and connections for supply, delivery and drain pipes; the said heat-insulated cover being split along lines joining the centers of afore-mentioned pipes, and to two points on its circumference for easy removal.

11. In a hot water supply system; an upright tank, having its top head concave and its bottom head convex, the sides of which extend below said bottom head to form a lower compartment; said lower compartment containing a heating chamber, having its lower end communicating with a conduit, passing through the said convex bottom of said tank, with a plurality of outlets disposed at right angles to its axis; a second conduit substantially concentric and parallel to the first mentioned conduit, having its upper end terminating at a point near the inside top of said tank, and its lower end terminating at a point in, or below, the said lower compartment for delivery of hot water; a heating means; and a control for said heating means; the whole enclosed in a heat-insulating casing with removable bottom.

12. In a hot water storage tank, an upper compartment for water and a lower compartment open on its bottom end; a convex partition separating the two compartments; said partition having a plurality of openings into which are mounted; a drain pipe; a tube for containing a control means; and a support for a heating chamber, said support and said heating chamber located within the walls of said lower compartment.

13. In a hot water supply system, a storage tank having a plurality of openings in its lower head, into which are mounted; a drain pipe; a tube for containing a control means, having its upper end sealed; and a support, for a heating chamber and heating means; said support comprising a conduit, for leading cold water into and out of the bottom of said tank, with a smaller concentric conduit leading upwardly into body of said tank and down below said heating chamber for delivery of hot water from the tank; the said heating chamber, a supply pipe, a delivery pipe and a drain pipe extending below and within the projected diameter of said tank.

14. In a hot water supply system, a heat insulated storage tank having a plurality of openings in its lower head into which are mounted; a drain pipe; a tube for containing a control means, having its upper end sealed and its lower end open; and a conduit supporting a heating chamber and a heating means, said conduit, having openings into the said tank, at right angles to its longitudinal axis for leading water into or out of bottom of the tank with very little agitation, said conduit also surrounding a portion of a second smaller conduit, leading upwardly into the body of said tank and down below said heating chamber for delivery of hot water from the tank; the said heating chamber, a supply pipe, a delivery pipe and a drain pipe extending below and within the projected diameter of said tank.

15. In a hot water supply system, a heat-insulated storage tank having a plurality of openings in its lower portion into which are connected; a drain pipe; a tube, extending into the body of the said tank, having one end sealed and one end open, for housing a control means; a means for adjusting said means at any desired level; and a support for a heating chamber with its heating means, said support comprising a conduit, with openings into the said tank, for leading water into or out of the bottom of the tank with very little agitation, said conduit surrounding a portion of a second smaller conduit leading upwardly into the body of said tank and down below said heating chamber for delivery of hot water from the tank; the said heating chamber, a supply pipe, a delivery and a drain pipe, located near lower end of said tank.

16. In a hot water supply system, a heat insulated storage tank having a plurality of openings in its lower head into which are mounted; a drain pipe; a tube, extending upwardly into the body of the said tank, having its upper end sealed and its lower end open, for housing a control means and means for adjusting said means to any desired level; and a conduit communicating with a cold water supply, the bottom of the said tank, and a plurality of inclined heating chambers each with its heating means; said conduit supporting the said heating chambers at their lower ends and surrounding a portion of a smaller conduit, leading into the body of said tank and below said heating chambers for delivery of hot water from the tank; said heating chambers, a supply pipe, a delivery pipe, and a drain pipe located near lower end of said tank; the circulating pipes from the heat chambers extending upwardly within the heat-insulating casing to a point along the wall of said tank and into same, providing a circulating means for heating the water in said tank.

17. In a hot water supply system, a heat insulated storage tank having a plurality of openings near its lower end, into which are mounted; a cold water supply pipe, a drain pipe; a tube extending into the body of the said tank, having its upper end sealed and its lower end open, for housing a plurality of control means, which may be set at different levels; and a conduit communicating with the bottom of said tank, and a plurality of heating chambers, each with its individual heating element and each controlled by one of said control means; said conduit supporting the said heating chambers at their lower ends and surrounding a portion of a second smaller conduit, leading into the body of said tank and below said heating chambers for delivery of hot water from said tank; said heating chambers, a supply, a delivery, and a drain pipe extending below said tank and within the projected diameter of same; circulating pipes from said heat chambers extending beyond said projected diameter and upwardly within a heat-insulating casing to and through a plurality of points along the wall of said tank, providing a plurality of circulating means for heating water in said tank.

18. In a hot water storage tank; an upper compartment for water and a lower compartment open on its bottom end; a convex partition separating the two compartments; said partition having a plurality of openings into which are mounted; a drain pipe; a tube extending upwardly into the water compartment, having its upper end sealed and its lower end open, for housing a plurality of control means, which may be set at different levels within said tube; a conduit communicating with a water supply, the bottom of said tank, and a plurality of heating chambers, each with its individual heating element and each controlled by one of said control means; said conduit supporting the said heating chambers at their lower ends and surrounding a portion of a second smaller conduit, leading upwardly into the body of said tank and down below said heating chambers for delivery of hot water from the tank; said heating chambers, and connections for supply, delivery and drain pipes being located within the wall of said lower compartment; the circulating pipes from the heating chambers passing through the wall of lower chamber, upwardly parallel to wall of said tank and communicating with the interior of said tank at the same or different levels; the whole being enclosed in a heat-insulating casing with removable bottom.

19. An element used in conjunction with a hot water storage tank comprising; a chamber or casing having a horizontal section, one end of which communicates with a cold water supply and the lower end of an inclined heating chamber, the other end communicating with a vertical conduit, said vertical conduit, having a plurality of side openings in its upper portion communicating with said tank, supporting said element below said tank; a second conduit extending above, below, and having a portion of its length surrounded by first mentioned conduit; a circulating pipe leading from upper end of heating chamber into said tank; a heating unit mounted on lower side of heating chamber; and a control unit in thermal contact with water in said tank for controlling said heating unit.

20. An element used in conjunction with a hot water storage tank comprising: a casing having a section, one end of which communicates with a cold water supply and the lower ends of a plurality of inclined heating chambers, the other end communicating with a vertical conduit, said vertical conduit, having a plurality of side openings in its upper portion communicating with said tank, supporting said element below said tank; a second conduit extending above, below, and having a portion of its length surrounded by first mentioned conduit; a plurality of circulating pipes leading from upper ends of said heating chambers into said tank; a plurality of heating units mounted on said heating chambers, and one or more control units in thermal contact with water in said tank for controlling said heating units.

21. An element used in conjunction with a hot water storage tank comprising; a plurality of heating chambers located below said tank non-communicating on their upper ends and having lower ends communicating with a cold water supply and the lower part of said tank, conduit from said upper ends of said heating chambers communicating with the interior of the tank for causing water to circulate, a plurality of electrical heating units in heat exchange relation with said heating chambers, and control means for said heating units.

22. In a hot water storage tank, an element comprising a plurality of heating chambers located below said tank with non-communicating upper ends having their lower ends and communicating with a cold water supply and with the water in lower part of said tank, a plurality of heating units mounted under and in contact with said heating chambers; reflectors positioned below said heating unit for reflecting stray heat rays upward, conduits from the upper ends of heating chambers communicating with the interior of said tank for circulation, and control means for said heating units.

23. In a hot water storage tank, an element comprising a plurality of heating chambers located below said tank with non-communicating upper ends and lower ends communicating with a cold water supply and with lower part of said tank, a plurality of heating units mounted under and in contact with said heating chambers, reflectors positioned below said heating units for reflecting stray heat rays upward, conduits from the upper ends of said heating chambers communicating with the interior of the tank for circulation, and single or multiple means for controlling the current supplied to said heating units.

24. In a hot water storage tank, an element comprising a plurality of heating chambers having their lower ends communicating with the lower part of said tank, a plurality of electric heating units receiving their power from a single or multiple source of supply; conduits from the upper ends of heating chambers communicating with interior of tank for circulation; and means for controlling the current supplied to said heating units.

25. In a hot water storage system, an element comprising a plurality of heating chambers, the upper ends of which communicate with a cross passage through orifices, said cross passage being divided into chambers, conduits from one of said chambers for leading heated water upward, a casing one end of which communicates with the lower ends of said heating chambers, a conduit having a plurality of side openings in its upper portion said upper portion communicating with water in the bottom of said tank and its lower end communicating with said casing, a second conduit for delivering hot water having a portion of its length surrounded by said first mentioned conduit, and heating and control means for said chambers.

26. In a hot water storage tank, a substantially vertical hot water conduit leading from a point near the top of the tank, passing through and in thermal contact with lower or colder strata of water in said tank and a cold water supply pipe concentric with said conduit, for causing a heat transfer from hot water withdrawn through said conduit to colder water in and entering said tank.

27. In a hot water storage tank, a substantially vertical hot water conduit leading from a point near the top of the tank, and having a portion of its length formed into a coil or radiator, in thermal contact with colder water in the lower part of said tank, and a cold water supply conduit concentric with a portion of said first conduit for causing a heat transfer from hot water drawn through said radiator, to colder water in and entering said tank.

28. In a hot water supply system, a conduit for leading hot water down through the lower part of a storage tank, a thermostatic valve within said conduit, communicating with colder water, adapted to mix cold and hot water and deliver the same at a predetermined temperature.

29. In a hot water supply system, a tank, a delivery pipe for hot water, a thermostatically controlled valve within said delivery pipe and communicating with the bottom of said tank, adapted to mix cold water with the hot water, delivering said mixture at a predetermined temperature.

30. In a hot water supply system, an upright storage tank with open top and having sides extending downwardly below a bottom head to form a lower compartment, said lower compartment containing a cold water supply pipe connection, a delivery pipe, a heating means communicating with a conduit containing a control means for the heating means; a top cover for said tank; a valve in the cold water supply line for controlling the flow of hot water; the whole being enclosed in a heat insulated casing with removable top and bottom.

31. In a hot water supply system; an upright storage tank, with removable top head, having sides extending below its bottom head to form a lower compartment; said lower compartment containing an inclined heating chamber with an electric heating element on its under side, the lower end of said chamber communicating with the cold water supply and a conduit in the bottom of said tank; a conduit from upper end of said chamber leading through wall of said lower compartment, along the outside of tank proper, to a point between the top and bottom of said tank; a delivery pipe extending from a point near the top of said tank downwardly in substantially the center axis of the tank to a point below its bottom head for connection to said supply system; a means in a cold water supply line for controlling the amount of hot water delivered; a thermostat for controlling the temperature of the water in the tank, and an upright heat-insulating envelope enclosing all said parts.

32. A storage tank, a heating chamber with an electrical heat unit mounted thereon, means in thermal contact with water in said tank for controlling said heat unit; supply, delivery, and drain pipes; a thermostatic valve within said heating chamber and actuated by the temperature of the water in said chamber for controlling the admission of cold water thereto, for causing said chamber to deliver hot water to said tank at a predetermined temperature, and a heat-insulating casing enclosing all said parts.

33. In a hot water storage tank; an upper compartment for water, a lower compartment with an open bottom, a convex partition separating the two compartments, said partition having a plurality of openings into which are mounted, a drain pipe, a tube for containing a control means, a support for a heating chamber and an electrical heating unit, said control means controlling current supplied said heating unit, a thermostatic valve within said heating chamber to regulate admission of cold water thereto, and a heat-insulating casing enclosing all of said parts.

34. A storage tank; a heating chamber with an electrical heat unit mounted thereon, means in thermal contact with water in said tank for controlling said heat unit, cold water supply connection, delivery, and drain pipes, a thermostatic valve for controlling the admission of cold water to said heating chamber, a thermostatic valve, within said delivery pipe communicating with said cold water supply and adapted to mix said cold water with hot water for delivery at a predetermined temperature, and a heat-insulating casing enclosing all of said parts.

35. A storage tank, a heating chamber with an electrical heat unit mounted thereon, means in thermal contact with water in said tank for controlling said heat unit, supply, drain, and delivery pipes, said delivery pipe comprising a conduit for leading hot water down through the lower part of said storage tank; a thermostatic valve for controlling the admission of cold water to said heating chamber, and a thermostatic valve within said delivery pipe for mixing cold water with hot water for delivery at a predetermined temperature.

36. A storage tank having two compartments separated by a partition, liquid in both compartments in communication; heating chambers with attached heating units, one of said heating chambers communicating with a cold water supply, the lower part of one of said compartments and the upper part of same compartment, the other heating chamber communicating with the lower and upper parts of second compartment, control means in thermal contact with liquid in said compartments for controlling heat units on respective heating chambers, and a delivery pipe leading from each compartment.

37. A storage tank having an upper and a lower compartment, separated by a partition; liquid in both compartments, communicating through an opening in said partition; heating chambers with attached heating units, one of said heating chambers communicating with a cold water supply, lower part of said lower compartment and the upper part of same compartment, the other heating chamber communicating with lower and upper parts of said upper compartment; a heat-insulating casing enclosing said parts; and a delivery pipe leading from each compartment.

38. A storage tank having an upper and a lower compartment separated by a partition; liquid in both compartments, communicating through an opening in said partition; heating chambers with attached heating units, mounted below said storage tank, one of said heating chambers communicating with a cold water supply, lower part of said lower compartment and upper part of same compartment, the other heating chamber communicating with lower and upper parts of said upper compartment; a closed vertical conduit passing through lower compartment and into upper compartment through said partition; thermostats in said vertical conduit, a lower one for controlling heater on first mentioned heating chamber and an upper one for controlling heater on the other heating chamber; a heat-insulating casing enclosing said parts; and delivery pipes leading from said compartments.

39. A storage tank having an upper and a lower compartment separated by a partition; the sides of said tank extending below the bottom head of lower compartment to form a housing; liquid in both compartments communicating through an opening in said partition; heating chambers with attached heating units mounted within said housing, one of said heating chambers communicating with a cold water supply, lower part of said lower compartment and upper part of same compartment, the other heating chamber communicating with lower and upper parts of said upper compartment; control means in thermal contact with liquid in said compartments for controlling heat units on respective heating chambers; a heat-insulating casing enclosing said parts; and a delivery pipe leading from each compartment.

40. A plurality of compartments forming a hot water storage tank, individual heating means for said compartments located below said tank, control means therefor, a cold water supply, a heat-insulating casing enclosing said parts, and a delivery means extending downwardly from each of said compartments.

41. A plurality of compartments forming a hot water storage tank, a plurality of partitions between said compartments, liquid in all compartments communicating through openings in said partitions, individual means for heating liquids in each compartment, a cold water supply communicating with said heating means, a plurality of thermostats, each in thermal contact with one of said compartments and controlling its individual heating means, a heat-insulating casing enclosing said parts, and a delivery means from each compartment.

42. In an upright hot water tank, a plurality of compartments separated by partitions, individual heating means for said compartments located below said tank, control means therefor, and means for replacing water in any compartment by water from the next lower compartment.

43. In a hot water supply system, a storage tank, an electrically heated chamber external to said tank but near its lower end, a cold water feed to the lower part of said tank, a hot water outlet from the upper part of the tank passing through the cold water area of said tank, a cold water feed to said chamber, and outlets for leading heated water from said chamber to said tank.

44. In a hot water system, an insulated storage tank, an external heating chamber near the lower part of said tank, controlled means for delivering heated water to the tank at any desired level, a hot water delivery pipe for withdrawing water from the top of said tank, means for controlling the temperature of water in said tank and means for returning part of the heat of outgoing water to colder water in said tank.

45. In a hot water storage tank, a hot water delivery pipe having a portion of its length in thermal contact with colder water, effecting a heat transfer, and a cold water pipe concentric therewith and terminating in said tank below the level of the hot water.

46. In a hot water storage tank, a cold water conduit surrounding a portion of a hot water delivery pipe for effecting a heat transfer, said conduit being concentric with and substantially shorter than said pipe.

47. In a hot water supply system, a plurality of electrically heated chambers separated thermally, each adapted to operate independently, and a common water supply for all said chambers.

48. In an electric water storage system, a tank, an electrical heating chamber beneath said tank, a heat-insulating casing enclosing said tank, external connections to said tank passing through said casing in its lower portion.

49. In a hot water supply system, a tank, an electric water heating element with a plurality of individual heating chambers beneath said tank, individual outlets for heated water, individual electrical heating units each having control means associated therewith, and a common cold water inlet chamber.

50. In a hot water storage system, a tank, a heating chamber beneath lower end of said tank, a cold water connection between said heating chamber and said tank, a conduit for leading heated water into said tank, a delivery pipe for hot water from said tank and a cold water supply pipe leading either to bottom of said tank or to said heating chamber.

51. In a hot water storage system, a tank, a plurality of external heating chambers having heating elements thereon, means for controlling rate of flow through said chambers, means for delivering heated water to any desired level of said tank, automatic temperature control at one or more levels of said tank and an insulating casing about said tank and delivery means.

52. In a hot water storage system, a tank, a heat-insulating casing surrounding said tank, a delivery pipe leading from the upper part of said tank downwardly within said heat-insulating casing for delivering hot water from said tank, and a conduit secured to the bottom of said tank for leading cold water thereto at reduced velocity.

53. In a hot water system, a tank, a heating chamber located outside of and beneath said tank, and means within said heating chamber for admitting of cold water thereto.

54. In a hot water system, a tank, a plurality of strata each of said strata having a higher temperature than the one immediately below it, a plurality of heating means, conduits for delivering heated water from said means to the levels of said strata, means for controlling said heating means, and a plurality of delivery pipes for delivering hot water from said strata.

55. In a hot water storage system, an element comprising; a plurality of heating chambers, with non-communicating upper ends, lower ends communicating with a cold water supply and with lower part of said tank, a plurality of heating units mounted under and in contact with said heating chambers, conduits from upper ends of said heating chambers communicating with interior of tank for circulation, and single or multiple means for controlling current supplied to said heating units.

56. A hot water storage tank, a heating chamber beneath the tank, a plurality of heating units adjacent to the heating chamber, a plurality of conduits connecting the top and bottom areas of the tank with the heating chamber arranged to be included within a single pressure joint and a thermostat adjacent the bottom area of the tank for shutting off the electricity when a predetermined amount of water has been heated to a predetermined temperature.

57. A hot water storage tank, a heating chamber below the tank, and having relatively poor thermal contact with the lower part of the tank, a plurality of conduits connecting the top and bottom areas of the tank with the heating chamber, arranged to be included within a single pressure joint, and a thermostat adjacent to the bottom area of the tank for shutting off the electricity when a predetermined amount of water has been heated to a predetermined temperature.

58. A hot water storage tank, a heating chamber beneath the tank with relatively low thermal conductive relation to the tank, electric heater elements adjacent the heating chamber, a conduit leading from the heating chamber to the top of the tank, a second conduit leading from the heating chamber to the bottom of the tank, a conduit connecting to bottom of the heating chamber and a plurality of conduits connecting to the bottom of the tank, a casing of heat insulation around the tank and heating chamber with all conduits entering or leaving adjacent the bottom of the insulating casing, a thermostat located so as to shut off the electricity when a desired amount of water is heated to a desired temperature.

59. In a hot water tank, an element comprising a plurality of heating chambers having their lower ends connected to said tank at different levels and their upper ends connected to the tank at other levels than said first levels whereby strata of fluid at different temperatures are obtained within the tank, and means for controlling heat supplied to said chambers.

60. A storage tank, a heating chamber having an electrical heat unit in heat exchange relation thereto, means in thermal contact with water in said tank for controlling said heat unit, a thermostatic valve within said chamber for controlling the admission of cold water thereto, and a heat insulating casing enclosing said parts.

61. In a hot water supply system, a tank, a water heating chamber beneath said tank, a conduit for delivering heated water from the chamber to the tank and an electrical heat unit mounted in heat exchange relation to said chamber whereby the removal of said unit therefrom may be accomplished without loss of fluid from said system.

62. In a hot water supply system, a tank containing liquid in strata of different temperatures, and individual heating chambers beneath said tank for maintaining the temperatures of each of said strata.

63. In a hot water supply system, a tank containing liquid in strata of different temperatures, individual heating chambers beneath said tank for maintaining the temperatures of each of said strata, and a removable heating unit mounted on each of said chambers and adapted to pass heat to liquid therein through a wall thereof.

64. In a hot water supply system, a tank, a heating chamber beneath said tank, a conduit between said tank and the chamber forming a main support for the latter, and means terminating at different levels in the tank for passing water thereto and therefrom, said means communicating therewith through the interior of said supporting conduit.

65. In a hot water supply system, a tank, a heating chamber beneath said tank, and a plurality of conduits passing through the bottom of said tank and terminating therein at different levels, one of said conduits forming a main support for said chamber.

66. In a hot water supply system, a tank, a heating chamber beneath said tank, and a plurality of conduits passing through the bottom of said tank and terminating therein at different levels, one of said conduits forming a main support for the chamber and having the other conduits passing therethrough.

67. A hot water storage tank, a circulation heater beneath said tank, a support for said heater substantially on the center axis of said tank, and passageways through said support through which liquid streams flow in opposite directions.

68. A hot water storage tank, a circulation heater beneath said tank, a support for said heater substantially on the center axis of said tank, passageways through said support through which liquid streams flow in opposite directions, and means for diffusing incoming liquid to ensure stratification of liquid in said tank at different temperature levels.

69. A hot water storage tank, a circulation heater beneath said tank, a support for the heater having passageways for the flow of liquid therethrough in opposite directions, and means for connecting different levels within the tank to different levels within the heater to secure a predetermined heat stratification within the tank.

70. In a hot water supply system the storage tank, a plurality of heating chambers external to the tank and having electric heaters thereon, conduit connections from said heating chambers leading to several different levels of the tank, adapted to form strata of water of different temperatures in the tank, a delivery pipe for withdrawing hot water from the top of the tank, said pipe leading downward through said strata and surrounded in its lower end by cold water, and means to control the heaters in accordance with the temperatures at a plurality of levels in the tank.

71. In a hot water system, a storage tank, an assembly of heating chambers external to said tank, conduit connections from each of said chambers to a different level in the tank, and having electric heaters secured to said heating chambers and controlled by the temperature of the water at different levels, a cold water inlet connected to the heating chambers, a hot water delivery pipe for withdrawing hot water from the top of the tank, said delivery pipe being surrounded by stratified volumes of water of different temperatures and passing at its lower end through said cold water inlet.

72. In a hot water system including a storage tank, an element comprising a plurality of heating chambers external to the tank and having conduit connections to different levels of the tank, electric heaters contacting the walls of said chambers, each controlled by the temperature of the water at a different one of said levels, a cold water sump for delivering water to said chambers, a delivery pipe for withdrawing hot water from the top of the tank and passing the same downwardly through stratified levels of water in said tank, the lower end of said pipe passing through cold water in said sump and having a port communicating therewith.

73. A hot water storage system according to claim 72 in which the delivery pipe extends downwardly within the tank and passes out through a cold water area below the heating elements.

74. A hot water storage system according to claim 72 in which the delivery pipe extends downwardly within the tank and passes out through a cold water area below the heating elements, said pipe having a port formed therein for admitting water thereto from said cold water area.

LEE POWERS HYNES.